(12) United States Patent
Nagara et al.

(10) Patent No.: US 6,891,875 B2
(45) Date of Patent: May 10, 2005

(54) OPTICAL DISC DEVICE

(75) Inventors: Toru Nagara, Tokyo (JP); Motoi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 10/153,486

(22) Filed: May 21, 2002

(65) Prior Publication Data

US 2002/0196727 A1 Dec. 26, 2002

(30) Foreign Application Priority Data

May 23, 2001 (JP) ........................................ 2001-154177

(51) Int. Cl.[7] .................................................. H01S 3/06
(52) U.S. Cl. ............................ 372/67; 372/43; 372/44; 372/45; 372/46; 372/47; 372/48; 372/49; 372/50
(58) Field of Search .............................. 372/43–50, 67; 369/124.01

Primary Examiner—David Vu
Assistant Examiner—Delma R. Flores Ruiz

(74) Attorney, Agent, or Firm—Frommer Lawrence & Haug LLP; William S. Frommer; Samuel S. Lee

(57) ABSTRACT

An object of the present invention is to remove a laser beam source noise in an optical disc device.

An optical disc device comprises: a laser beam source which outputs a laser beam, a reproducing signal beam-receiver which receives a signal beam from an optical disc and generates a reproducing signal, a beam-source monitoring beam-receiver which detects the laser beam from the laser beam source, and a beam splitter which divides the laser beam from the laser beam source into the beams to the reproducing signal beam-receiver and to the beam-source monitoring beam-receiver; an output signal from the beam-source monitoring beam-receiver being used for removing a noise contained in the reproducing signal from the reproducing signal beam-receiver through a noise cancellation calculation. In the configuration of the optical disc device, an output current of the beam-source monitoring beam-receiver is set so that a laser beam source noise caused by the laser beam source is greater than a circuit-related noise caused by a circuit including the beam receivers.

12 Claims, 1 Drawing Sheet

OPTICAL DISC DEVICE

BACKGROUND OF THE INVENTION

1. Field of the Invention

The present invention relates to an optical disc device for reproducing information by irradiating a laser beam onto an optical disc, and more specifically to a technique of removing a noise component generated by fluctuation of a laser beam from a reproducing signal.

2. Description of the Related Art

In recent years, since information recording density in the optical disc has been intensified, it becomes increasingly difficult to achieve an S/N ratio (signal to noise ratio) necessary for reproducing information. Reproducing signals obtained by irradiating a laser beam onto an optical disk contain various noise components. The noise contained in the reproducing signal can be classified into the following three types by the cause:

(1) Disc noise caused by roughness or inconsistency on the surface of an optical disc, (2) Circuit-related noise generated in a circuit including a beam receiver and an amplifier, and (3) Laser beam source noise (LD noise) caused by a laser diode (LD) which is the light source.

The circuit-related noise can be further classified into beam-receiver (PD) amplifier noise generated depending upon a design of a first-stage amplifier of the beam receiver, shot noise caused by fluctuation of electrons in receiving current of the beam receiver, thermal noise due to conversion resistance of the first-stage current-voltage converter and amplifier of the beam receiver, and the other noise. The thermal noise can be obtained theoretically.

The generation of laser beam source noise is due to fluctuation in wavelength and power of the laser beam, and is caused by a transition of emission mode triggered by temperature change, return beam and so on. The most dominant noise is quantum noise caused by fluctuation of electrons in the electric current that flows through the laser diode.

In recent years, there has been developed a technique for removing the laser beam source noise. Specifically, an optical disc device is provided with a reproducing signal beam-receiver which receives a return beam from the optical disc and generates a reproducing (RF) signal, and a beam-source monitoring beam-receiver which monitors the laser beam source and generates an automatic power control (APC) signal. The beam source noise contained in the reproducing signal is removed by extracting a laser beam source noise cancellations (LNC) signal from the beam-source monitoring beam-receiver.

Referring to FIG. 1, a conventional device and method for removing the laser beam source noise will be described. The example to be described was disclosed in the Japanese Laid-Open Patent No. 10-124919 which was the Japanese Patent Application No. 8-276008 filed on Oct. 18th, 1996 by the same applicant as of the present application. For details see the above gazettes.

As shown in the FIGURE, the optics system of this optical disc device includes a laser diode 11 as a beam source, a collimator lens 12, a polarization beam splitter 13, a quarter-wave plate 14, an object lens 15, a condensing lens 16, a reproducing signal beam-receiver 17, and a beam-source monitoring beam-receiver 18. The laser beam from the laser diode 11 is made into parallel beams by the collimator lens 12, and then divided into two beams by a half mirror 13A of the polarization beam splitter 13. One of the divided beams is polarized by the half mirror 13A and then received by the beam-source monitoring beam-receiver 18. The other of the divided beams passes through the half mirror 13A, the quarter-wave plate 14 and the object lens 15, and reaches an information recording surface of an optical disc 20. The beam from the information recording surface of the optical disc is polarized by the half mirror 13A of the polarization beam splitter 13, passes through the condensing lens 16 and then received by the reproducing signal beam-receiver 17.

Now, an output signal from the beam-source monitoring beam-receiver 18 should show a level fluctuation corresponding to fluctuation in a wavelength and power of the laser beam. Specifically, the output signal from the beam-source monitoring beam-receiver 18 should have the same phase as the laser beam source noise contained in an output signal from the reproducing signal beam-receiver 17. Therefore, the laser beam source noise can be removed from the reproducing signal through a cancellation calculation of the output signal from the beam-source monitoring beam-receiver 18 from the output signal from the reproducing signal beam-receiver 17.

An example of the cancellation calculation will be described. The output signal from the reproducing signal beam-receiver 17 is supplied to an accumulator, via a current-voltage converter and amplifier. The output signal from the beam-source monitoring beam-receiver 18 is supplied to the accumulator, via a current-voltage converter and amplifier, after the signal phase is inverted by a phase inverter. The accumulator outputs a reproducing signal from which laser beam source noise has been removed.

As described above, the reproducing signal includes not only the laser beam source noise but also the circuit-related noise such as the beam-receiver amplifier noise, or the like. To reliably perform the canceling operation of the laser beam source noise and to reduce the circuit-related noise are not always achievable simultaneously.

If the circuit or the optics is designed so that the laser beam source noise can be completely removed from the reproducing signal by performing the cancellation calculation between the output signal from the reproducing signal beam-receiver 17 and the output signal from the beam-source monitoring beam-receiver 18, sometimes the result is an increase in the circuit-related noise. Accordingly, if the cancellation calculation yields an increase in the circuit-related noise greater than a decrease in the laser beam source noise, the noise is increased as a result.

Consequently, it is an object of the present invention to provide an optical disc device capable of minimizing the noise contained in the reproducing signal, taking into account not only the laser beam source noise but also the circuit-related noise.

SUMMARY OF THE INVENTION

According to the present invention, an optical disc device comprises: a laser beam source which outputs a laser beam, a reproducing signal beam-receiver which receives a signal beam from the optical disc and generates a reproducing signal, a beam-source monitoring beam-receiver which detects the laser beam from the laser beam source, and a beam splitter which divides the laser beam from the laser beam source into beams to the reproducing signal beam-receiver and to the beam-source monitoring beam-receiver; performing a noise cancellation calculation to remove a noise contained in the reproducing signal from the reproducing signal beam-receiver using an output signal from the beam-source monitoring beam-receiver, in which an output current of the beam-source monitoring beam-receiver is set so that a laser beam source noise caused by the laser beam source is greater than a circuit-related noise caused by a circuit including the beam receivers.

Further, the output current i from the beam-source monitoring beam-receiver satisfies the following mathematical expressions:

$$i > [q + (q^2/B + p^2)^{0.5}]/B$$

$$B = 10^{b/10}$$

where, $b(dB/\sqrt{Hz})$ represents a relative intensity of noise (RIN) of a target value of a laser beam source noise, $p(A/\sqrt{Hz})$ represents an input-conversion noise current of an amplifier noise (including a thermal noise) of a current-voltage converter and amplifier connected to the beam receiver, and $q = 1.6 \times 10^{-19}$.

An optical disc device comprises: a laser beam source which outputs a laser beam, a reproducing signal beam-receiver which receives a signal beam from an optical disc and generates a reproducing signal, a beam-source monitoring beam-receiver which detects the laser beam from the laser beam source, and a beam splitter which divides the laser beam from the laser beam source into beams to the reproducing signal beam-receiver and to the beam-source monitoring beam-receiver; performing a noise cancellation calculation to remove a noise contained in the reproducing signal from the reproducing signal beam-receiver using an output signal from the beam-source monitoring beam-receiver, in which the beam splitter divides the laser beam from the laser beam source and sends the divided beam to the beam-source monitoring beam-receiver at a predetermined coupling efficiency so that a laser beam source noise caused by the laser beam source is greater than a circuit-related noise caused by a circuit including the beam receivers.

Further, the coupling efficiency y satisfies the following mathematical expression:

$$y > [q + (q^2/B + p^2)^{0.5}]/(x \cdot \alpha \cdot B)$$

where, x represents the amount (W) of output beam from the laser beam source, y represents the proportion of the beam received by the beam-source monitoring beam-receiver to the total amount of the laser beam from the laser beam source, i.e. the coupling efficiency, and $\alpha$ represents photoelectric conversion efficiency (A/W) of the beam-source monitoring beam-receiver.

DESCRIPTION OF THE PREFERRED EMBODIMENT

Figure 1:
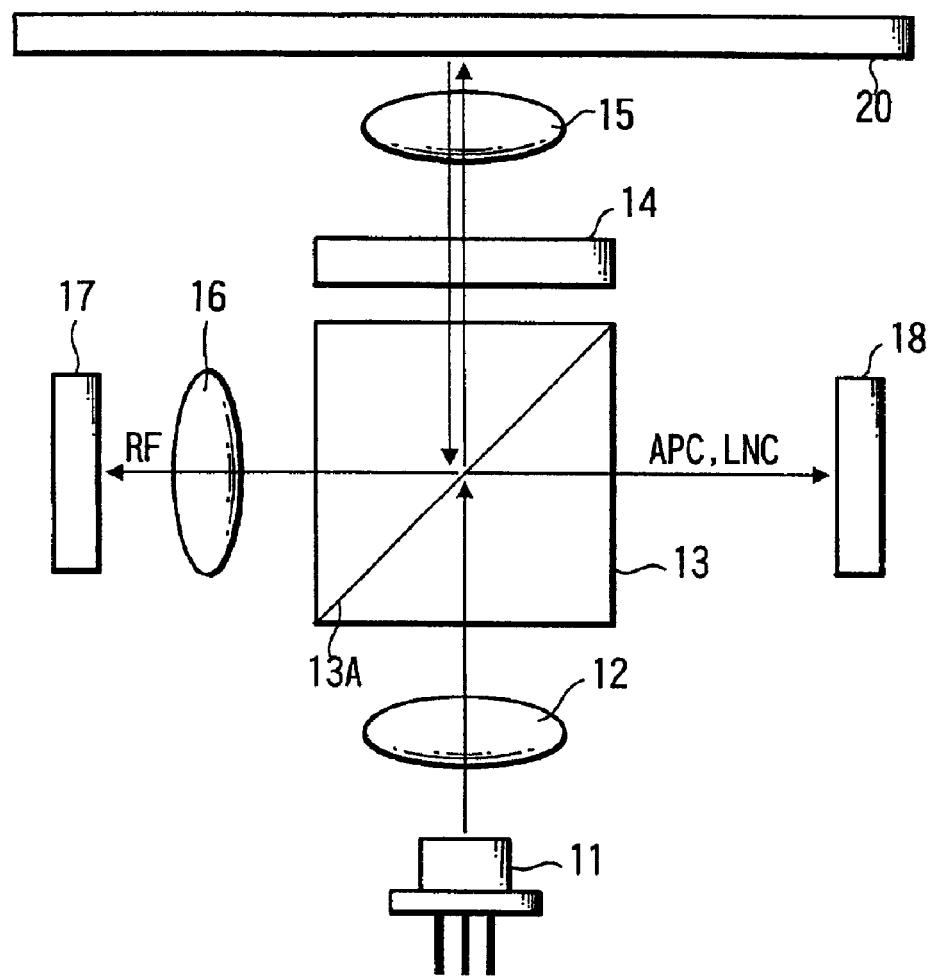
FIG. 1 is a diagram illustrating an example of optics of an optical disc device.

Electric current $i(A)$ generated in the beam-source monitoring beam-receiver is given by the following expression:

$$i = x \cdot y \cdot \alpha \qquad \text{[Expression 1]}$$

where, x represents the amount (W) of output beam from the laser beam source, y represents the proportion of the beam received by the beam source monitoring beam-receiver to the total amount of the laser beam from the laser beam source, i.e. coupling efficiency, and $\alpha$ represents photoelectric conversion efficiency (A/W) of the beam-source monitoring beam-receiver.

Laser beam source noise z $(A/\sqrt{Hz})$ generated in the current $i(A)$ of the beam-source monitoring beam-receiver is given by the following expression:

$$z = i \cdot 10^{b/20} \qquad \text{[Expression 2]}$$

where, the $b(dB/\sqrt{Hz})$ represents relative intensity of noise (RIN) of the laser beam source noise. A shot noise s $(dB/\sqrt{Hz})$ generated in the beam-source monitoring beam-receiver is given by the following expressions:

$$s = (2 \cdot q \cdot i)^{0.5}$$

$$q = 1.6 \times 10^{-19} \qquad \text{[Expression 3]}$$

With $p(A/\sqrt{Hz})$ representing an input-conversion noise current of the amplifier noise (including the thermal noise) of the current-voltage converter and amplifier connected to the beam-source monitoring beam-receiver, the amount of the input-conversion noise current is given by the following expression:

$$n = (s^2 + P^2)^{0.5} \qquad \text{[Expression 4]}$$

where, n represents the circuit-related noise. When the circuit-related noise n is compared with the laser beam source noise z, the circuit-related noise is dominant in the noise contained in the reproducing signal, in the case where the circuit-related noise n is greater than the laser beam source noise z, however, the laser beam source noise is dominant in the noise contained in the reproducing signal, in the case where the laser beam source noise z is greater than the circuit-related noise n.

By performing a cancellation calculation between the output signal from the beam-source monitoring beam-receiver 18 and the output signal from the reproducing signal beam-receiver 17, the laser beam source noise is removed from the reproducing signal, but the circuit-related noise is added. If the circuit-related noise is dominant, an increase in the circuit-related noise is greater than a decrease in the laser beam source noise. As a result, the noise is increased. If the laser beam source noise is dominant, an increase in the circuit-related noise is smaller than a decrease in the laser beam source noise. As a result the noise is decreased.

The condition, under which the laser beam source noise z becomes greater than the circuit-related noise n, i.e. (z>n) will be explained. In order for the laser beam source noise z to be greater than the circuit-related noise, the following expression must be true.

$$z^2 > s^2 + p^2 \qquad \text{[Expression 5]}$$

The z in the left side is substituted with Expression 2, whereas s in the right side is substituted with Expression 3. After simplified and transformed, the following expression is obtained:

$$i > [q + (q^2/B + p^2)^{0.5}]/B$$

$$B = 10^{b/10}$$

where, $b(dB/\sqrt{Hz})$ represents a target value for the laser beam source noise, to which an appropriate value will be set. The $p(A/\sqrt{Hz})$ represents an input-conversion noise current of the amplifier noise (including the thermal noise) of the current-voltage converter and amplifier connected to the beam receiver, and is a known value. The q has a constant value which comes from Expression 3. When the right side of Expression 6 is substituted with these values, the expression yields a limit value for the output current i of the beam-source monitoring beam-receiver. Optics design or circuit design is made so that the output current i of the beam-source monitoring beam-receiver exceeds this limit value. For example, laser diode driving current is selected so that the value of the output current i of the beam-source monitoring beam-receiver always exceeds this limit value.

Next, i in the left side of Expression 6 is substituted with Expression 1, to obtain the coupling efficiency y, which is given by the following expression.

$$y > [q + (q^2/B + p^2)^{0.5}]/(x*\alpha*B) \quad \text{[Expression 7]}$$

The amount of beam output x (W) from the laser beam source for the beam source monitoring, and the photoelectric conversion efficiency α (A/W) of the beam-source monitoring beam-receiver are known values in general. By setting the target value b(dB/√Hz) for the laser beam source noise to an appropriate value, a value of the right side in Expression 7, i.e. a limit value for the coupling efficiency y can be obtained. The optics design or the circuit design is made so that the coupling efficiency y always exceeds this limit value. For example, in the half mirror of the polarization beam splitter, a ratio of the passing beam and the polarized beam from the laser diode is so selected.

With the example above, according to the present embodiment, by increasing the output current i of the beam-source monitoring beam-receiver or the coupling efficiency y beyond a predetermined limit value, the laser beam source noise z becomes greater than the circuit-related noise n. Therefore, through the cancellation calculation between the output signal from the reproducing signal beam-receiver 17 and the output signal from the beam-source monitoring beam-receiver 18, a decrease in the laser beam source noise becomes greater than an increase in the circuit-related noise, resulting in decrease in noise.

According to the optical disc device of the present invention, by increasing the output current i of the beam-source monitoring beam-receiver beyond a predetermined limit value, the laser beam source noise z becomes greater than the circuit-related noise n. Therefore, through the cancellation calculation between the output signal from the reproducing signal beam-receiver and the output signal from the beam-source monitoring beam-receiver, a decrease in the laser beam source noise is greater than an increase in the circuit-related noise, resulting in decrease in noise.

According to the optical disc device of the present invention, by increasing the coupling efficiency y beyond a predetermined limit value, the laser beam source noise z becomes greater than the circuit-related noise n. Therefore, through the cancellation calculation between the output signal from the reproducing signal beam-receiver and the output signal from the beam-source monitoring beam-receiver, a decrease in the laser beam source noise is greater than an increase in the circuit-related noise, resulting in decrease in noise.

Having described preferred embodiments of the invention with reference to the accompanying drawing, it is to be understood that the invention is not limited to those precise embodiments and that various changes and modifications could be effected therein by one skilled in the art without departing from the spirit or scope of the invention as defined in the appended claims.

What is claimed is:

1. An optical device for processing optical signals coming to and from an optical disc, comprising:

a laser beam source to output a laser beam, where the output level of the laser beam is controlled by a driving current;

a beam splitter to divide the laser beam into first and second laser beams, where the first laser beam is directed to the optical disc;

a reproducing signal beam receiver to receive an optical signal from the optical disc, said reproducing signal beam receiver operating to generate a reproducing signal;

a beam-source monitoring beam receiver to receive the second laser beam, said beam-source monitoring beam receiver operating to monitor the characteristics of the second laser beam, where said beam-source monitoring beam receiver generates a monitoring signal;

a noise cancellation apparatus configured to receive said monitoring signal and said reproducing signal, where said monitoring signal is used to substantially reduce noise contained in said reproducing signal; and a laser beam source current driver to provide said driving current for said laser beam source, where the amount of current generated in said monitoring signal is operatively adjusted so that laser beam source noise in said monitoring signal caused by said laser beam source is greater than circuit-related noise caused by circuits in the optical device.

2. The optical device of claim 1, wherein said noise cancellation apparatus includes an accumulator to compute a difference value between said reproducing signal and said laser beam source noise in said monitoring signal.

3. The optical device of claim 2, further comprising:

a first current-to-voltage converter disposed between said reproducing signal beam receiver and said accumulator, said first current-to-voltage converter operating to convert the reproducing signal into a first voltage signal before being input to said accumulator.

4. The optical device of claim 3, further comprising:

a first amplifier disposed between said first current-to-voltage converter and said accumulator, said first amplifier operating to amplify the first voltage signal before being input to said accumulator.

5. The optical device of claim 2, further comprising:

a second current-to-voltage converter disposed between said beam-source monitoring beam receiver and said accumulator, said second current-to-voltage converter operating to convert the monitoring signal into a second voltage signal before being input to said accumulator.

6. The optical device of claim 5, further comprising:

a second amplifier disposed between said second current-to-voltage converter and said accumulator, said second amplifier operating to amplify the second voltage signal before being input to said accumulator.

7. The optical device of claim 6, further comprising:

a phase inverter disposed between said second amplifier and said accumulator, said second phase inverter operating to invert the phase of the laser beam source noise in said monitoring signal before being input to said accumulator.

8. The optical device of claim 6, wherein the amount of current (i) generated in said monitoring signal by said beam-source monitoring beam receiver is operatively adjusted to exceed a limit value that is expressed as $$i > [q + (q^2/B + p^2)^{0.5}]/B,$$

where $B = 10^{b/10}$, b(dB/√Hz) represents a relative intensity of noise (RIN) of a target value of the laser beam source noise, p(A/√Hz) represents an input-conversion noise current of an amplifier noise (including a thermal noise) in said second current-to-voltage converter and said second amplifier, and q=1.6*10$^{-19}$.

9. An optical device for processing optical signals coming to and from an optical disc, comprising:

a laser beam source to output a laser beam, where the output level of the laser beam is controlled by a driving current;

a beam splitter to divide the laser beam into first and second laser beams, where the first laser beam is directed to the optical disc;

a reproducing signal beam receiver to receive an optical signal from the optical disc, said reproducing signal beam receiver operating to generate a reproducing signal;

a beam-source monitoring beam receiver to receive the second laser beam, said beam-source monitoring beam receiver operating to monitor the characteristics of the second laser beam, where said beam-source monitoring beam receiver generates a monitoring signal;

a noise cancellation apparatus configured to receive said monitoring signal and said reproducing signal, where said monitoring signal is used to substantially reduce noise contained in said reproducing signal; and a coupling efficiency adjuster operatively adjusting the coupling efficiency of said beam splitter so that laser beam source noise in said monitoring signal caused by said laser beam source is greater than circuit-related noise caused by circuits in the optical device.

10. The optical device of claim 9, wherein the coupling efficiency (y=a proportion of the laser beam received by the beam-source monitoring beam-receiver to the total output level of the laser beam source) of said beam splitter is operatively adjusted to exceed a limit value that is expressed as $$y > [q + (q^2/B + p^2)^{0.5}]/(x*\alpha B),$$

where B=10$^{b/10}$, b(dB/√Hz) represents a relative intensity of noise (RIN) of a target value of the laser beam source noise, p(A/√Hz) represents an input-conversion noise current of an amplifier noise (including a thermal noise) in current-to-voltage converter and amplifier that convert said monitoring signal into a voltage signal, and q=1.6*10$^{-19}$, x represents the output level of the laser beam source, and α represents photoelectric conversion efficiency of the beam-source monitoring beam receiver.

11. A method for processing optical signals coming to and from an optical disc, comprising:

outputting a laser beam;

splitting the laser beam into first and second laser beams, where the first laser beam is directed to the optical disc;

receiving an optical signal from the optical disc, and generating a reproducing signal;

receiving the second laser beam, and monitoring the characteristics of the second laser beam to generate a monitoring signal;

receiving said monitoring signal and said reproducing signal, and using said monitoring signal to substantially reduce noise contained in said reproducing signal; and operatively adjusting the amount of current generated in said monitoring signal so that laser beam source noise in said monitoring signal is greater than circuit-related noise.

12. A method for processing optical signals coming to and from an optical disc, comprising:

outputting a laser beam;

splitting the laser beam into first and second laser beams, where the first laser beam is directed to the optical disc;

receiving an optical signal from the optical disc, and generating a reproducing signal;

receiving the second laser beam, and monitoring the characteristics of the second laser beam to generate a monitoring signal;

receiving said monitoring signal and said reproducing signal, and using said monitoring signal to substantially reduce noise contained in said reproducing signal; and operatively adjusting the coupling efficiency in splitting the laser beam so that a laser beam source noise in said monitoring signal is greater than circuit-related noise.

* * * * *